United States Patent [19]

Clark et al.

[11] Patent Number: 5,296,010
[45] Date of Patent: Mar. 22, 1994

[54] CERAMIC CANDLE FILTER ARRANGEMENTS

[75] Inventors: Richard K. Clark, Doncaster; John E. Fackrell, Keyworth; John D. Stott, Solihull, all of England

[73] Assignee: Coal Industry (Patents) Limited, United Kingdom

[21] Appl. No.: 982,648

[22] Filed: Dec. 1, 1992

[30] Foreign Application Priority Data

Dec. 3, 1991 [GB] United Kingdom ........... 9125714

[51] Int. Cl.$^5$ ................ B01D 29/33; B01D 29/66; B01D 46/04
[52] U.S. Cl. .................. 55/523; 55/341.1; 55/DIG. 30
[58] Field of Search .............. 55/302, 341.1, 523, 55/DIG. 30, 350.1

[56] References Cited

U.S. PATENT DOCUMENTS

| | | | |
|---|---|---|---|
| 2,892,510 | 6/1959 | Wygant | 55/302 X |
| 2,892,512 | 6/1959 | Watts et al. | 55/302 X |
| 3,429,106 | 2/1969 | Abboud | 55/302 X |
| 3,431,709 | 3/1969 | Kawanami | 55/302 |
| 3,729,903 | 5/1973 | Espeel et al. | 55/302 X |
| 3,963,467 | 6/1976 | Rolschau | 55/302 X |
| 4,735,638 | 4/1988 | Ciliberti et al. | 55/302 |
| 4,812,149 | 3/1989 | Griffin et al. | 55/302 X |

OTHER PUBLICATIONS

P. M. Eggerstedt et al., "Choose the Right Ceramic for Filtering Hot Gases", Chemical Engineering Progress, Jan. 1993, pp. 62–68.

Primary Examiner—Robert Spitzer
Attorney, Agent, or Firm—Stevens, Davis, Miller & Mosher

[57] ABSTRACT

A ceramic filter candle arrangement employs a plurality of filter candles held within a tube plate by hold-down weights, each having a flow path, and includes a conduit communicating with the flow path and protruding into the candle filter. A passage is formed between the conduit and the internal wall of the filter candle and leads to at least one exhaust port. In operation, the passage and the exhaust port allow controlled pressure wave leakage during gas pulse cleaning of the filter candle.

6 Claims, 1 Drawing Sheet

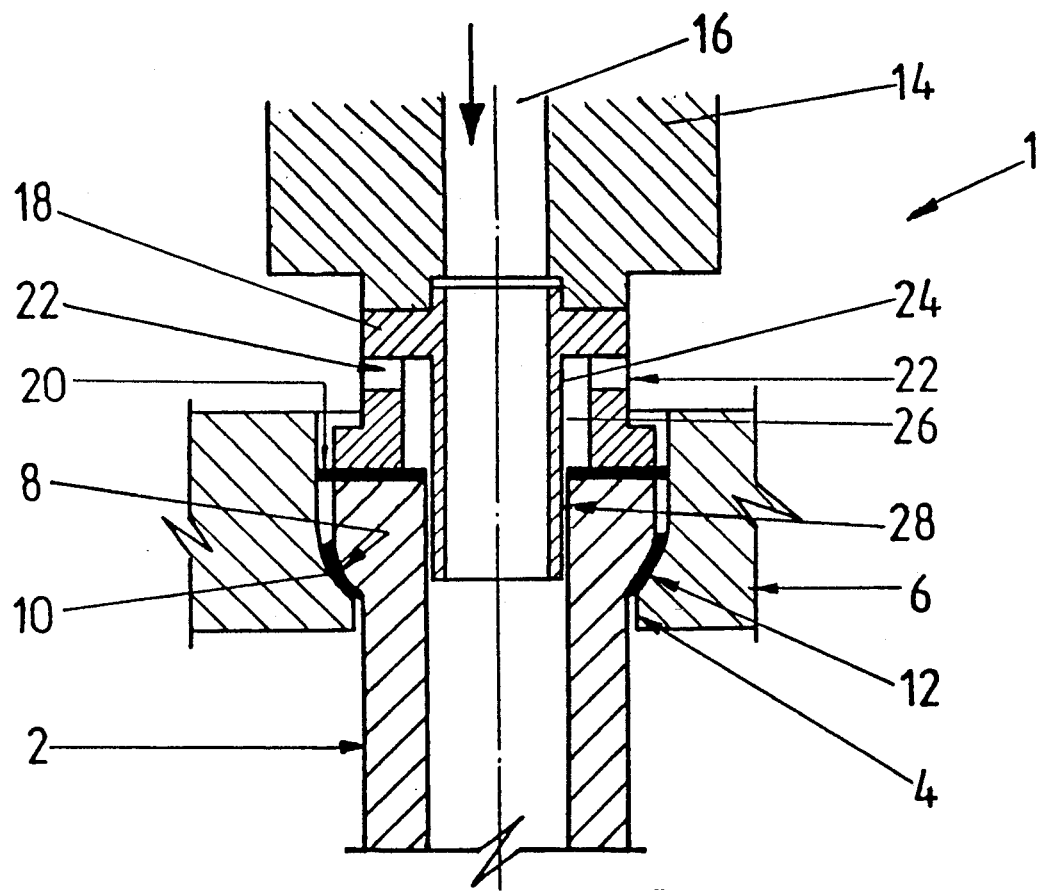

CERAMIC CANDLE FILTER ARRANGEMENTS

BACKGROUND OF THE INVENTION

This invention concerns improvements relating to ceramic candle filter arrangements.

Candle filters are employed for gas cleaning to remove particulates from gases, usually at elevated temperatures, the candles being formed of tubular ceramics material to withstand the high thermal stressing to which they are in use subjected. However, the ceramics material used in such a high temperature environment tends to be of a fragile nature and thus should only experience as minimal physical stress as possible in view of the cyclical thermal stressing which it undergoes in parallel by virtue of the cleaning mechanism.

Candle filters are usually cleaned by a reverse flow high pressure clean gas pulse which has the effect of discharging particles which have become arrested by the filter material. Conventionally, the filter candles are held in place in a tube plate which separates the particle-laden gas space from the filtered gas space in the filter housing. The candles are sealed into the tube plate by means of hollow hold-down weights suitably clamped in position thereover, each hollow weight forming a flow passage to the interior of the candle. The high pressure gas used as the cleaning medium is introduced to the weight by a pipe which terminates close to the open mouth of the hollow weight. In practice, it has been found that inter alia the dynamic forces of the gas pulse occasion movement of the candle and its associated weight, thus attenuating the force of the gas pulse and causing leaks with a resultant loss of efficacy and efficiency.

High pressure gas injected into the filter candle travels in a pressure wave along the candle and is reflected by the base of the candle to travel back along the candle interior. The reflected pressure wave then encounters the hollow weight, which incorporates a venturi, and causes it to move or bounce from its intended holding down position with the concomitant effect of impacting the top of the candle which, by virtue of its inherent fragility, is thereby weakened and breakage is accelerated. The same process will also allow the ceramic candle element to move and provide a leakage path for solid particles.

SUMMARY OF THE INVENTION

An object of the present invention is thus to provide an improved candle filter arrangement which negates or reduces the movement of the ceramic filter candles and disturbance of the hold-down weights.

Accordingly the invention provides a ceramic candle filter arrangement including a plurality of filter candles each sealingly secured within an aperture formed in a tube plate, a tubular weight engaging with each filter candle, a gas flow path extending through each weight, and a conduit registering with the flow path and extending into the candle to terminate therewithin, each conduit defining with its associated filter candle a passage leading to at least one exhaust port externally of the candle.

A clamping plate for clamping the weights onto the candles may be provided.

Advantageously, each conduit is connected to the tubular weight which is provided with an abutment portion for contact with the top of the associated filter candle. The abutment portion conveniently incorporates the exhaust port of which a plurality may be provided. The abutment portion may be in the form of a mounting collar having a series of holes provided in its wall, the holes constituting the exhaust ports. The passage defined between the conduit and the candle is preferably annular.

BRIEF DESCRIPTION OF THE DRAWING

By way of example only one embodiment of filter candle arrangement according to the invention is described below with reference to the accompanying drawing which is a cross-section of the arrangement.

DETAILED DESCRIPTION OF THE INVENTION

Referring to the drawing, there is shown at 1 a candle filter arrangement including a plurality of ceramic filter candles only one of which is depicted at 2. Each candle 2 registers in an aperture 4 formed in a tube plate 6, the candle being shouldered at 8 to make sealing contact through the agency of a gasket 10 with a correspondingly-shaped seat 12 of the aperture 4.

Each candle is held in sealing contact by means of a hold-down tubular weight 14 through which extends a gas flow path 16. A mounting collar 18 is affixed to the lower end of the weight 14 and constitutes an abutment portion for abutting the top of the candle 2 through the agency of a gasket 20. The mounting collar 18 has a number of radial holes 22 which form exhaust ports.

The mounting collar 18 has a conduit 24 which defines an exhaust chamber 26 therearound at its relatively upper end. The conduit 24 extends into the filter candle 2 and terminates a short distance therewithin. An annular passage 28 is defined between the external wall of the conduit 24 and the internal wall of the candle 2, the passage communicating with the exhaust chamber 26 and thus the holes 22.

The weights 14 are clamped in position over the filter candles 2 by an assembly (not shown) to ensure effective sealing of the candles on the respective seats 12.

In operation, the candle filter arrangement s installed for example to receive exhaust gas from a fluidized bed gasifier (not shown) to cleanse the gas of its particulate loading, the gas flow being across the defining walls of the candles 2 into the interior of the candle which filters the gas accordingly. At an appropriate time, a reverse high pressure gas flow is injected into the candles 2 through the conduits 24, the gas being introduced to the conduits from the flow paths 16 and emerging from the end of the conduit to deliver a gas pulse directly to the interior of the candles 2, thereby to discharge accumulated particulates from the interstices of the candle material and to clean the same.

The gas pulse creates a pressure wave within each candle 2 which moves down the candle 2 and is reflected at its end remote from the weight 14 to travel back along the candle. The present invention provides a mechanism for dissipating the pressure energy and in this connection, at least part of the gas flow back along the candle leaks through the annular passage 28 into the exhaust chamber 26 and thence is discharged or vented through the holes 22 in the mounting collar 18. In this way, the effect of the traveling pressure wave is minimized, the energy normally associated therewith decaying by virtue of the controlled leakage through the annular passage and the holes. The candle 2 is thus protected from the bounce phenomenon characteristic of conventional filter candle arrangements. The weights do not experience bouncing movement and therefore the tops of the candles do not undergo damaging impact.

The number and distribution of the holes 22 and the magnitude of the annular passage 28 are selected to give the required leakage rate.

It has been found that by employing the arrangement of the present invention, the life of the ceramic filter candles is, improved and problems of solid particle leakage are minimized. The invention secures these advantages over conventional designs by eliminating movement of the ceramic filter candles and the hold-down weights during pulse-jet cleaning thereby preserving the candle to tube sheet gasket seal.

An added advantage of the invention resides in the conduit which extends into the filter candle and in so doing ensures concentricity of the hold-down weight and the candle. This also assists in minimizing losses in pulse jet energy and in enhancing cleaning efficiency.

The arrangement of the invention is simple mechanically with no moving parts and can be applied to existing as well as new types of ceramic tubular candle filters employing hold-down weights.

We claim:

1. A ceramic candle filter arrangement including a plurality of filter candles, a tube plate, a plurality of aperture means formed in the tube plate, each filter candle being sealingly secured within a respective one of said aperture means, a tubular weight engaging with each filter candle, a gas flow path means being defined within and extending through each weight, and a conduit registering with the flow path means and extending into the candle to terminate therewithin, a passage means being defined between each conduit and each associated filter candle, and at least one exhaust port means located externally of the candle and communicating with said passage means.

2. An arrangement according to claim I in which each conduit is attached to its associated tubular weight.

3. An arrangement according to claim 1 in which each conduit is provided with an abutment portion for contact with the top of the associated filter candle.

4. An arrangement according to claim 3 in which the abutment portion incorporates the at least one exhaust port means.

5. An arrangement according to claim 4 in which the abutment portion comprises a mounting collar having a wall provided with a series of further aperture means, said further aperture means constituting exhaust port means.

6. An arrangement according to claim 1 in which the passage means defined between the conduit and the candle is annular.

* * * * *